United States Patent [19]

Mizuguchi

[11] 4,025,058
[45] May 24, 1977

[54] CONTINUOUS EXTRUDER FOR THERMOSETTING RESINS

[75] Inventor: Hideki Mizuguchi, Hiroshima, Japan

[73] Assignees: Japan Steel Works, Ltd.; DAI Nippon Toryo Co. Ltd., both of Japan

[22] Filed: Aug. 14, 1975

[21] Appl. No.: 604,531

[52] U.S. Cl. .................................. 259/192; 259/6; 259/DIG. 2; 259/DIG. 7; 259/DIG. 18; 425/204

[51] Int. Cl.² .......................................... B29B 1/10

[58] Field of Search ............ 259/6, 104, 192, 195, 259/DIG. 2, DIG. 7, DIG. 8, DIG. 18; 425/204

[56] References Cited

UNITED STATES PATENTS

| | | | |
|---|---|---|---|
| 1,518,129 | 12/1924 | Banbury | 259/DIG. 2 |
| 2,615,199 | 10/1952 | Fuller | 425/204 |
| 3,078,511 | 2/1963 | Street | 259/6 |
| 3,085,288 | 4/1963 | Street | 259/192 |
| 3,305,894 | 2/1967 | Boden et al. | 259/192 |
| 3,734,468 | 5/1973 | Cheng et al. | 259/DIG. 2 |
| 3,904,719 | 9/1975 | Fritsch | 425/204 |
| 3,923,291 | 12/1975 | Matsuoka et al. | 259/192 |

Primary Examiner—Richard E. Aegerter
Assistant Examiner—Richard R. Stearns
Attorney, Agent, or Firm—Larson, Taylor and Hinds

[57] ABSTRACT

A continuous extruder for thermosetting resins comprising two screws received in a cylinder so as to rotate in opposite directions. Each of these screws is successively divided into a feed portion, a rotor portion and a discharge portion from the end of the cylinder where one or more material supply orifices are located. The cylinder is opened at the opposite end so as to mount a die. The outside of the cylinder is surrounded by jackets for controlling temperature.

4 Claims, 3 Drawing Figures

CONTINUOUS EXTRUDER FOR THERMOSETTING RESINS

BACKGROUND OF THE INVENTION

The present invention relates to an extruder, and more particularly to an extruder for continuously extruding thermosetting resins.

Hitherto, the continuous extrusion of thermosetting resins had never been practised. That is, until the present time, thermosetting resins had generally been shaped in the following manner. First, the resins were preliminary kneaded with the addition of fillers, plasticizers, pigments, reinforcing material, etc. to produce a so-called premix, and later this premix was shaped separately by a press method or an injection molding method in a batch manner. Thus, thermosetting resins have been conventionally shaped in two steps.

However, in accordance with the recent development of products with new shapes and their uses such as profile-shaped products, rod-shaped products, etc., it has become the industry's strong desire to realize an apparatus which makes it possible to continuously knead thermosetting resins with additives and extrude them into shapes without requiring previously prepared premixes.

SUMMARY OF THE INVENTION

It is an object of the present invention to provide a continuous extruder for thermosetting resins which does not require previously prepared premixes so that thermosetting resins with additives such as fillers, plasticizers, etc. can be directly supplied, sufficiently kneaded and continuously extruded through a discharge orifice.

Another object of the present invention is to provide a continuous extruder for thermosetting resins which can be directly supplied with raw materials such as thermosetting resins, fillers, plasticizers, etc. and fully knead them for continuous extrusion through a discharge orifice so that when an appropriate die is mounted to the discharge orifice extruded products can be continuously obtained in the desired shape.

According to the present invention, a continuous extruder for thermosetting resins is provided which comprises two screws adapted to be rotated in opposite directions and a cylinder adapted to contain the said screws. Each of the said screws is divided lengthwise into a feed portion, a rotor portion and a discharge portion. Each of the said portions are given an outer configuration most suitable for feeding forward the raw materials, and sufficiently kneading and extruding them under pressure, respectively, when both of said screws are cooperatively rotated. The cylinder is provided with one or more raw material supply orifices at its rear end portion, and opened at its forward end to mount a die. Further, the cylinder is surrounded by jackets for controlling temperature.

BRIEF DESCRIPTION OF THE DRAWINGS

Other objects and advantages of this invention will become apparent from the following description prepared in conjunction with the accompanying drawings wherein a single embodiment of this invention is set forth by way of illustration and example; wherein.

DESCRIPTION OF THE PREFERRED EMBODIMENTS

Figure 1:
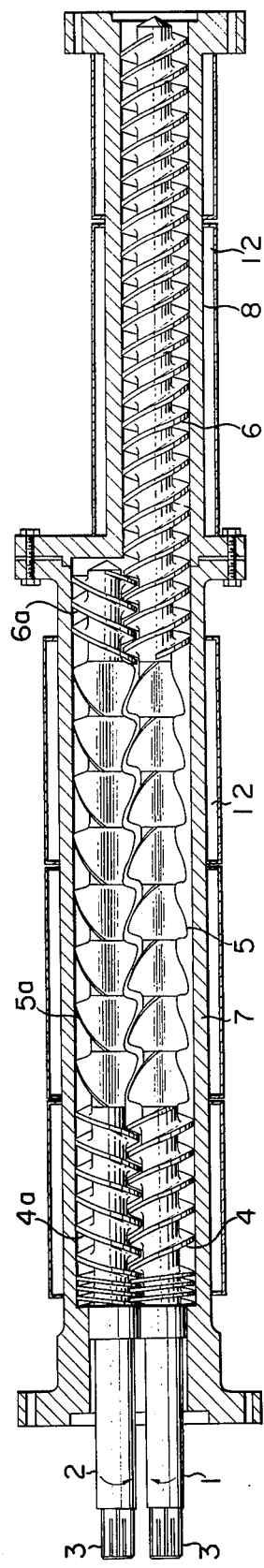
FIG. 1 is a crossectional plan view of one embodiment of the present invention.

The continuous extruder for thermosetting resins according to the present invention comprises principally two screws and one or more cylinders.

As shown in the drawings, screws 1 and 2 are adapted to be rotated in opposite directions within the cylinder(s) by any known driving means not shown in drawings by splines 3, respectively formed on the rearmost end of the respective screws. In this connection, it should be noted that in the drawings one of the screws, e.g. screw 1, is shown as having a longer axial length than the other, i.e. screw 2, so that the former is constituted as a single screw construction at its forward discharge portion, but both screws 1 and 2 may have identical axial lengths.

Both screws 1 and 2 are divided into several portions in the axial direction from the splined end to the forward discharge end in accordance with their function and shape.

In order, these portions include a feed portion 4 or 4a having the function of feeding the raw materials forward, rotor porton 5 or 5a having the function of thoroughly kneading the raw materials, and a discharge portion 6 or 6a having the function of continuously discharging the kneaded raw materials under pressure through a discharge orifice of the cylinder.

Feed portion 4 or 4a has a conventional helical feed screw of the pitch proper for its rotation whereby material is fed forward in the manner generally adapted for extruders of synthetic resins. The lead of screw is reversed between both feed portions 4 and 4a. Further, the flights of screws 1 and 2 mesh with each other at the feed portions 4, 4a.

Figure 2:
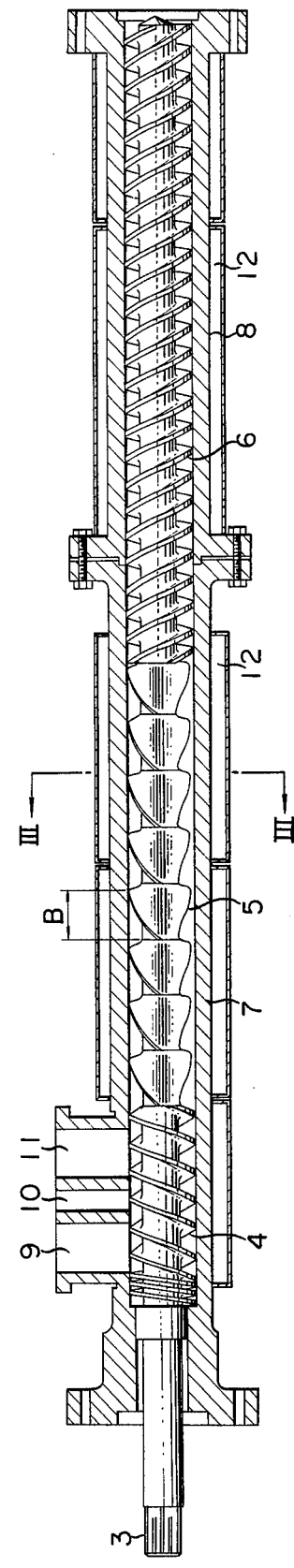
FIG. 2 is a sectional elevational view of the embodiment shown in FIG. 1.
Figure 3:
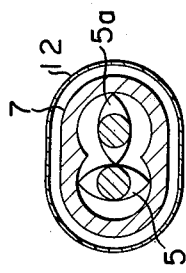
FIG. 3 is a front sectional view taken at line III — III of FIG. 2.

Rotor portion 5 or 5a is formed by a series of rotor sections each having a length B (see FIG. 2). The cross sectional design of these sections corresponds generally to that of the old batch-type Banbury-type rotor blades shown in FIG. 3, whereby opposite projecting blades of each section are respectively twisted oppositely at an angle of about 90° between the length B or both ends as suggested in FIGS. 1 and 2. The number of the rotor sections and the directions of the leads may be selected as desired, and the lead angles between the successive rotor sections also may be varied or even reversed in order to provide an optimum degree of kneading depending on the kind of the materials to be kneaded.

Supply portion 6 or 6a has a conventional helical feed screw of the pitch proper for its rotation to discharge the kneaded materials towards the discharge orifice of the cylinder under pressure. Supply portion 6 or 6a is similar in its configuration to that of feed portion 4 or 4a, but its pitch is smaller and at least one of part of it has a much longer axial length than feed portion 4 or 4a.

The cylinder receiving screws 1 and 2 for rotation is composed of two parts; that is, a rear cylinder 7 and a forward cylinder 8, rear cylinder 7 contains both screws 1 and 2, whereas forward cylinder 8 contains only screw 1.

Further, provided in the upper wall of rear cylinder 7, near the splined ends and at the portion corresponding to feed portion corresponding to feed portions 4 and 4a of screws 1 and 2, respectively, are raw material supply orifices 9, 10 and 11 adjacent to each other between the center lines of both screws 1 and 2 in the axial direction of cylinders 7 and 8. It will be appreciated that the specific embodiment provides for the three raw material supply orifices 9, 10 and 11 for thermosetting resins, fillers and reinforcing materials respectively.

However, the number of the raw material supply orifices may be changed in accordance with the materials to be treated.

Forward cylinder 8 is opened at its end as a discharge orifice which is adapted to detachably mount any die means for the purpose of shaping the kneaded material directly after its extrusion from the extruder through the discharge orifice.

Further, rear and forward cylinders 7 and 8 are provided respectively with jackets 12 around their exterior for the purpose of controlling the temperature of material contained therein.

A single embodiment of the present invention was described above, its operation is described below.

The raw materials such as thermosetting resins, fillers, plasticizer, reinforcing materials, etc. are appropriately supplied through material supply orifices 9, 10 and 11 into rear cylinder 7 and conveyed forward by the operation of feed portions 4, 4a of screws 1 and 2, respectively, which are rotating in opposite directions within rear cylinder 7, to rotor portions 5, 5a of screws 1 and 2 where the raw materials are fully kneaded in order to be further conveyed to supply portions 6, 6a of screws 1 and 2. Subsequently, the kneaded materials are continuously extruded from the extruder under a pressure through the discharge orifice. If desired, the materials can be shaped into products when they are extruded through an appropriate die attached to the discharge orifice of cylinder 8. It will be appreciated that in rotor portions 5, 5a the raw materials are powerfully kneaded by the respective Banbury-type rotor blades of the respective rotor sections. The kneading action can be multiplied when the lead angles of the blades are varied or reversed between certain rotor sections.

While a preferred embodiment of the present invention has been illustrated and described herein, it should be understood that modifications and changes may be made without departing from the spirit of the invention.

What is claimed is:

1. A continuous extruder for thermosetting resins, comprising first and second oppositely rotatable screw members and an elongate housing within which said screw members are located, said screw members each comprising a first, feed portion for feeding raw materials forwardly along said housing, a second, rotor portion, having discontinuous flights, for kneading and mixing the raw materials fed thereto from said feed portion, and a third, discharge portion for discharging the kneaded and mixed raw materials under pressure, at least the feed portions of said screw members meshing with each other so as to provide uniform feeding of the raw materials, said housing including first, second and third orifices, located at said feed portions of said screw members, for receiving thermosetting resin materials, filler materials and reinforcing materials, respectively, said housing being open at the end thereof opposite to the feed portions of said screw members, and including jacket means, in surrounding relationship thereto, for controlling the temperature of the raw materials received by the extruder, said rotor portions of said screw members being constituted by a series of rotor sections which intermesh to provide forward feeding of the raw materials; each of said rotor sections having a cross-sectional design corresponding to that of batch-type Banbury-type rotor blades and oppositely projecting blades of each of said rotor sections being respectively twisted oppositely at a given angle between both ends, each of said blades being twisted by substantially 90° along the length thereof between the ends of the blade.

2. A continuous extruder for thermosetting resins as claimed in claim 1, wherein said feed portions of said screws are constituted by helical feed screw members and the lead of said screws is reversed between both said feed portions.

3. A continuous extruder for thermosetting resins as claimed in claim 2, wherein said discharge portions of said screw members are constituted by helical feed screws of a pitch less than that of said feed portions, the lead of said feed screws of said discharge portions being reversed between both said discharge portions, and at least one of said discharge portions having a longer axial length than that of at least one of said feed portions.

4. A continuous extruder for thermosetting resins as claimed in Claim 1, wherein the axial lengths of the said screw members are different, and said housing is axially divided into a rear section and a front section which are rigidly connected together; said rear portion containing both of said screw members and said front portion containing only the longer screw member.

* * * * *